US012650931B2

(12) United States Patent　　　(10) Patent No.:　US 12,650,931 B2
Lal et al.　　　　　　　　　　　　　　(45) Date of Patent:　　　Jun. 9, 2026

(54) ATOMIC UPDATE INSTRUCTIONS WITH BIT MASKING

(71) Applicant: Advanced Micro Devices, Inc., Santa Clara, CA (US)

(72) Inventors: Reshma Lal, Vancouver, WA (US); David A. Kaplan, Austin, TX (US); Jelena Ilic, Austin, TX (US); Jeremy Wayne Powell, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/898,584

(22) Filed: Sep. 26, 2024

(65) Prior Publication Data

US 2026/0086800 A1　　Mar. 26, 2026

Related U.S. Application Data

(60) Provisional application No. 63/592,916, filed on Oct. 24, 2023.

(51) Int. Cl.
　　*G06F 9/30*　　　　(2018.01)
　　*G06F 9/38*　　　　(2018.01)
(52) U.S. Cl.
　　CPC ...... *G06F 9/30018* (2013.01); *G06F 9/30021* (2013.01); *G06F 9/30038* (2023.08);
　　　　　　　(Continued)
(58) Field of Classification Search
　　CPC ............. G06F 9/30018; G06F 9/30021; G06F 9/30038; G06F 9/3004; G06F 9/30072; G06F 9/30087; G06F 9/3834
　　See application file for complete search history.

(56) References Cited

U.S. PATENT DOCUMENTS 6,581,063 B1 *　6/2003　Kirkman ............. G06F 16/9024
　　　　　　　　　　　　　　　　　　707/999.102
7,185,183 B1　　2/2007　Uhler
　　　　　　　　　　　(Continued)

FOREIGN PATENT DOCUMENTS

WO　　　2014209269 A1　12/2014

OTHER PUBLICATIONS

"International Search Report and Written Opinion", International Application No. PCT/US2024/052833, Feb. 10, 2025, 11 pages.
　　　　　　　　　　　　(Continued)

*Primary Examiner* — Shawn Doman
(74) *Attorney, Agent, or Firm* — FIG. 1 Patents

(57)　　　　　　　ABSTRACT

A masked atomic update instruction is described that atomically performs compare and exchange operations on select bits of a data structure. Executing the masked atomic update instruction compares respective source values with respective values of bits stored at a destination data storage location. If the respective bit values match, one or more of the respective bit values at the destination are replaced with one or more defined replacement values. Alternatively, if the respective bit values do not match, the destination is not modified. The masked atomic update instruction enables a processing unit to mask out bits of the destination data storage location that are not involved in the comparison or update. The masked atomic update instruction thus provides bit-level granularity by which another thread is prevented from accessing bits of the destination data storage location. This bit-level granularity advantageously permits multiple threads to simultaneously access a common data storage location.

20 Claims, 4 Drawing Sheets

(52) U.S. Cl.
CPC ........ *G06F 9/3004* (2013.01); *G06F 9/30072*
(2013.01); *G06F 9/30087* (2013.01); *G06F*
*9/3834* (2013.01)

(56) References Cited

U.S. PATENT DOCUMENTS

| | | | |
|---|---|---|---|
| 7,634,638 | B1 | 12/2009 | Jensen |
| 8,090,919 | B2 | 1/2012 | Sahita et al. |
| 8,127,292 | B1 | 2/2012 | Dobrovolskiy et al. |
| 8,458,386 | B2 | 6/2013 | Smith et al. |
| 8,862,853 | B2 | 10/2014 | Sahita et al. |
| 9,367,671 | B1 | 6/2016 | Dobrovolskiy et al. |
| 9,747,123 | B2 | 8/2017 | Nakajima et al. |
| 10,169,244 | B2 | 1/2019 | Kaplan et al. |
| 10,447,728 | B1 | 10/2019 | Steinberg |
| 10,705,976 | B2 | 7/2020 | Sahita et al. |
| 10,866,909 | B2 | 12/2020 | Dewan et al. |
| 11,669,335 | B2 | 6/2023 | Shanbhogue et al. |
| 12,229,047 | B2 | 2/2025 | Quinn et al. |
| 2004/0158720 | A1 | 8/2004 | O-Brien |
| 2009/0006800 | A1 | 1/2009 | Bellofatto et al. |
| 2009/0172328 | A1 | 7/2009 | Sahita et al. |
| 2009/0216984 | A1 | 8/2009 | Gainey, Jr. et al. |
| 2009/0217098 | A1 | 8/2009 | Farrell et al. |
| 2009/0222816 | A1 | 9/2009 | Mansell et al. |
| 2010/0250895 | A1 | 9/2010 | Adams et al. |
| 2010/0333090 | A1 | 12/2010 | Wright et al. |
| 2011/0153989 | A1* | 6/2011 | Rajwar ............... G06F 9/30038 |
| | | | 712/225 |
| 2013/0024598 | A1 | 1/2013 | Serebrin et al. |
| 2013/0227248 | A1 | 8/2013 | Mehta et al. |
| 2014/0380009 | A1 | 12/2014 | Lemay et al. |
| 2016/0048464 | A1 | 2/2016 | Nakamjima et al. |
| 2016/0299851 | A1 | 10/2016 | Mattson, Jr. et al. |
| 2017/0031865 | A1* | 2/2017 | Eyole .................. G06F 9/30032 |
| 2017/0090963 | A1 | 3/2017 | Nakajima et al. |
| 2017/0177348 | A1* | 6/2017 | Ould-Ahmed-Vall ....................... |
| | | | G06F 9/30018 |
| 2018/0032443 | A1 | 2/2018 | Kaplan et al. |
| 2018/0173641 | A1 | 6/2018 | Parker et al. |
| 2018/0373647 | A1 | 12/2018 | Dewan et al. |
| 2019/0026173 | A1* | 1/2019 | Stephens ............. G06F 11/0787 |
| 2019/0102323 | A1 | 4/2019 | Durham et al. |
| 2019/0245799 | A1* | 8/2019 | Kumar ................ H04L 67/1097 |
| 2020/0201786 | A1 | 6/2020 | Ouziel et al. |
| 2022/0179653 | A1* | 6/2022 | Moudgill ............ G06F 9/30038 |
| 2023/0098117 | A1 | 3/2023 | Wang et al. |
| 2024/0028337 | A1* | 1/2024 | Eapen ................. G06F 9/30018 |
| 2025/0130844 | A1 | 4/2025 | Lal et al. |
| 2025/0130958 | A1 | 4/2025 | Lal et al. |

OTHER PUBLICATIONS

"International Search Report and Written Opinion", International Application No. PCT/US2024/052834, Feb. 10, 2025, 12 pages.
"International Search Report and Written Opinion", International Application No. PCT/US2024/052843, Feb. 16, 2025, 12 pages.
AMD , "AMD SEV-TIO: Trusted I/O for Secure Encrypted Virtualization", [retrieved from the internet on Nov. 24, 2024], <https://www.amd.com/content/dam/amd/en/documents/developer/sev-tio-whitepaper.pdf>, Mar. 2023, 15 pages.
AMD , "Strengthening VM Isolation with Integrity Protection and more.", [retrieved from the internet on Nov. 24, 2024], <https://www.amd.com/content/dam/amd/en/documents/epyc-business-docs/white-papers/SEV-SNP-strengthening-vm-isolation-with-integrity-protection-and-more.pdf>, Jan. 2020, 20 pages.
DMTF , "Secured Messages using SPDM Specification", [retrieved from the internet on Dec. 21, 2024], <https://www.dmtf.org/sites/default/files/standards/documents/DSP0277_1.1.0.pdf>, May 17, 2022, 24 pages.
Kaplan , et al., "Amd Memory Encryption", [retrieved from the internet on Dec. 21, 2024], <https://www.amd.com/content/dam/amd/en/documents/epyc-business-docs/white-papers/memory-encryption-white-paper.pdf>, Oct. 18, 2021, 12 pages.
Kaplan , "Protecting VM Register State With SEV-ES", [retrieved from the internet on Dec. 21, 2024], <https://www.amd.com/content/dam/amd/en/documents/epyc-business-docs/white-papers/Protecting-VM-Register-State-with-SEV-ES.pdf>, Feb. 17, 2017, 8 pages.
Kocher, Paul , et al., "Spectre Attacks: Exploiting Speculative Execution", 2019 IEEE Symposium on Security and Privacy (SP), [retrieved from the internet on Dec. 21, 2024], <https://spectreattack.com/spectre.pdf>, 2019, 19 pages.
Lal, Reshma , et al., "Pursuant to MPEP § 2001.06(b) the applicant brings the following co-pending application to the Examiner's attention:", U.S. Appl. No. 63/592,916, filed Oct. 24, 2023, 75 pages.
Lal, Reshma , et al., "Pursuant to MPEP § 2001.06(b) the applicant brings the following co-pending application to the Examiner's attention:", U.S. Appl. No. 18/926,095, filed Oct. 24, 2024, 58 pages.
Lal, Reshma , et al., "Pursuant to MPEP § 2001.06(b) the applicant brings the following co-pending application to the Examiner's attention:", U.S. Appl. No. 18/926,087, filed Oct. 24, 2024, 64 pages.
Non-Final Office Action issued in U.S. Appl. No. 18/926,087, mailed Mar. 2, 2026, 45 pages.

* cited by examiner

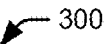

300

```
┌─────────────────────────────────────────────────────────┐
│                           302                           │
│           Receive masked atomic update instruction      │
└─────────────────────────────────────────────────────────┘
                            │
                            ▼
┌─────────────────────────────────────────────────────────┐
│                           304                           │
│  Mask at least one data field associated with a         │
│  destination address specified by the masked atomic     │
│  update instruction                                     │
└─────────────────────────────────────────────────────────┘
                            │
                            ▼
┌─────────────────────────────────────────────────────────┐
│                           306                           │
│  Obtain at least one unmasked data field from           │
│  destination address                                    │
└─────────────────────────────────────────────────────────┘
                            │
                            ▼
```

308
Unmasked data field(s) match source data specified by masked atomic update instruction?

No

Yes

```
┌─────────────────────────────────────────────────────────┐
│                           310                           │
│  Write masked replacement value specified by the        │
│  masked atomic update instruction to the destination    │
│  address                                                │
└─────────────────────────────────────────────────────────┘
```

```
┌─────────────────────────────────────────────────────────┐
│                           312                           │
│  Do not modify data fields associated with the          │
│  destination address                                    │
└─────────────────────────────────────────────────────────┘
```

FIG. 3

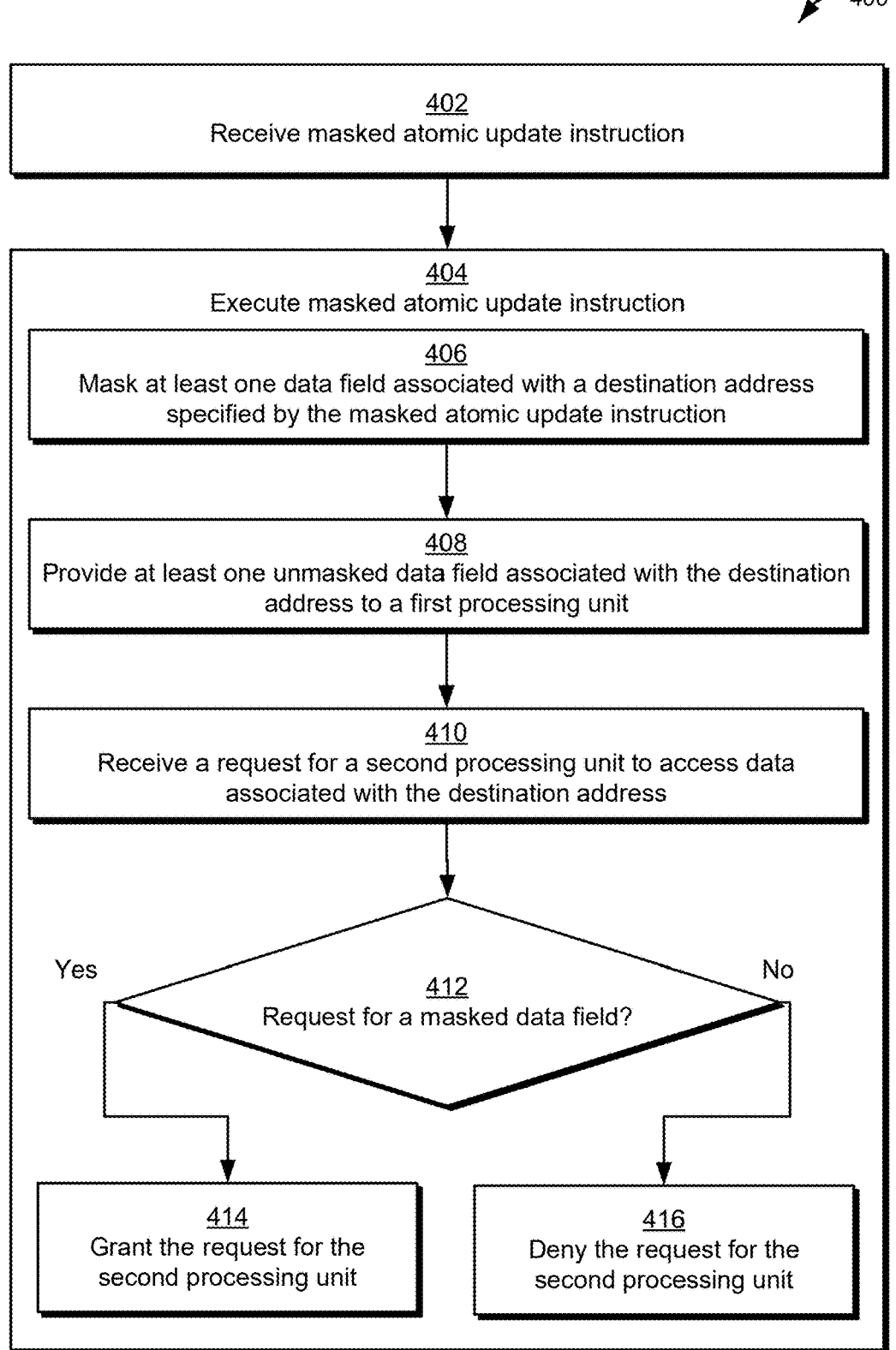

400

402
Receive masked atomic update instruction

404
Execute masked atomic update instruction

406
Mask at least one data field associated with a destination address specified by the masked atomic update instruction

408
Provide at least one unmasked data field associated with the destination address to a first processing unit

410
Receive a request for a second processing unit to access data associated with the destination address Yes                    412                    No
Request for a masked data field?

414
Grant the request for the second processing unit

416
Deny the request for the second processing unit

FIG. 4

ATOMIC UPDATE INSTRUCTIONS WITH BIT MASKING

PRIORITY

This application claims priority to U.S. Provisional Ser. No. 63/592,916, filed Oct. 24, 2023, the disclosure of which is hereby incorporated by reference in its entirety.

BACKGROUND

Computing systems often share data resources, such as in system architectures where different virtual machines share common memory locations, in multi-threaded programming approaches where multiple threads utilize shared data addresses, and so forth. Sharing data resources, however, presents challenges such as synchronization, ensuring data integrity, and avoiding race conditions to ensure that the computing system functions as intended. Proper synchronization techniques, such as atomic operations, ensure that only a single entity (e.g., a single virtual machine or a single thread) accesses critical data at a time, thus maintaining data integrity and preventing race conditions.

BRIEF DESCRIPTION OF THE DRAWINGS

FIG. 3 is a block diagram of a non-limiting example procedure describing performance of executing a masked atomic update instruction.

FIG. 4 is a block diagram of a non-limiting example procedure describing permitting access by different processing units to data stored at a common destination address while one processing unit executes a masked atomic update instruction.

DETAILED DESCRIPTION

Figure 1:
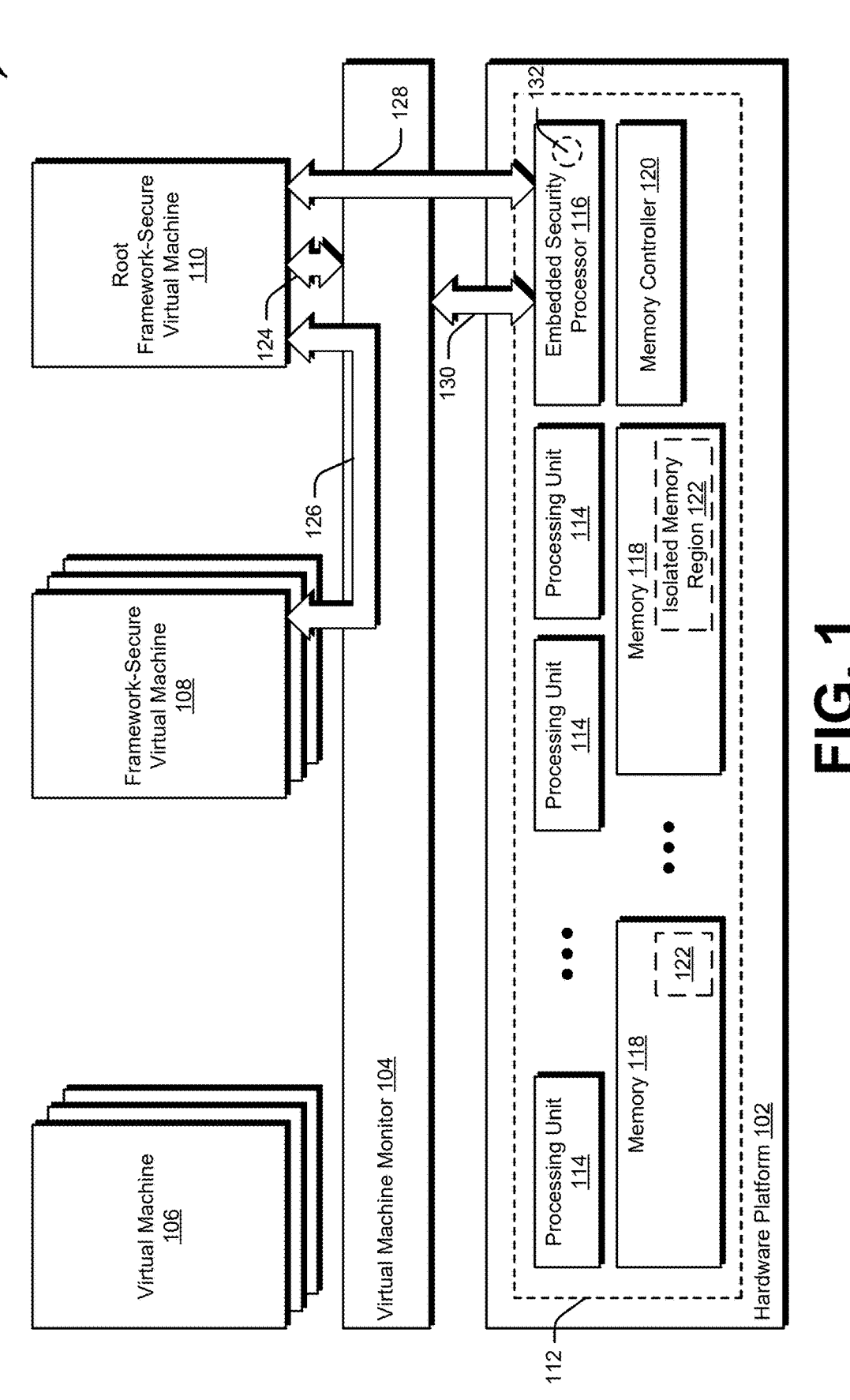
FIG. 1 is a block diagram of a non-limiting example system having a hardware platform that is operable to execute masked atomic update instructions using techniques described herein.

Computing systems often share data resources to enhance performance and efficiency. One common example of sharing data resources is when a computing system implements different threads. A thread is a smaller unit of a process that is designed to run concurrently with other threads (e.g., other threads within the same process) while sharing the same memory space (e.g., sharing data stored at a common memory address). Data resource sharing is particularly useful in virtual machine implementation, which inherently face virtualization resource constraints, such that sharing data resources among threads is crucial for maximizing the utilization of system resources and improving the overall speed and responsiveness of computational tasks running in virtualized environments.

In virtual machine implementations, utilizing a single hardware device to run multiple virtual machines improves resource efficiency and reduces computational costs. By sharing data resources among different threads within each virtual machine, the overall performance and responsiveness of computational tasks is improved. Sharing data resources allows a single physical hardware platform to host multiple virtual environments (e.g., each with its own isolated operating system and computational tasks), while efficiently sharing underlying hardware resources such as processing units, memory, and data storage. Running multiple virtual machines on a single hardware platform optimizes resource utilization, reduces the need for additional hardware platforms, and thus reduces overall computational cost (e.g., reduces power consumption). Such technical benefits are particularly advantageous in data centers and cloud computing environments, where scalability and efficient use of resources are crucial. Efficient data sharing among threads in this context ensures that each virtual machine operates smoothly, providing reliable and high-performance services without the overhead of managing multiple physical hardware platforms.

Sharing data resources, however, presents technical challenges, such as when different threads compete for access to common data storage locations. As one example challenge, synchronization issues arise, as concurrent access to shared data resources (e.g., by different virtual machines, by different processing units, combinations thereof, and so forth) can lead to race conditions, where the outcome of a computational task depends on a sequence of thread executions, potentially causing data corruption or inconsistencies when one thread is interrupted by another. To address these technical challenges, some conventional approaches implement locks on data resources, such that one entity (e.g., virtual machine, processing unit, or the like) accessing a data storage location prevents access by different entities to the data storage location. However, implementing locks to manage access to shared data storage locations introduces computational overhead and creates conditions for deadlock, where a thread is waiting for data resource access indefinitely. Ensuring atomicity of computational operations is critical to prevent partial data modifications (e.g., partial updates) that render data in an inconsistent state. Additionally, balancing performance and computational resource contention becomes challenging, as excessive locking degrades system performance, while insufficient locking compromises data integrity.

As one conventional solution to avoid such technical challenges, computational instructions are designed to ensure that computational operations performed using shared data resources are completed atomically (e.g., executed as a single, indivisible step that cannot be interrupted or accessed by another thread). As a specific example, the CMPXCHG (Compare and Exchange) instruction in x86 computational architectures is designed for performing atomic operations on a data structure. Specifically, CMPXCHG compares the value in a specific data storage location (e.g., CPU register) with a value at a different, "destination," data storage location (e.g., a location in memory). If the values in the different data storage locations match, CMPXCHG replaces the destination value with a defined replacement value for the particular computational task. Otherwise, if the values in the different data storage locations do not match, the destination value is not modified.

The CMPXCHG instruction thus performs a comparison and, if successful, a corresponding data value exchange in a single, indivisible step, ensuring atomicity. Such atomicity prevents other threads from interfering with the operation, maintaining data integrity without the need for slower lock-based mechanisms. However, while CMPXCHG advantageously avoids the drawbacks facing lock-based mechanisms for protecting shared data resources, CMPXCHG atomically protects an entirety of the destination storage location (e.g., prevents read or write access by another thread to any bits of data associated with the destination storage location).

Although CMPXCHG is useful in ensuring atomic completion of the corresponding compare and exchange operations, ensuring atomicity with CMPXCHG requires that all data bits associated with a data storage location be prevented from access by another thread while the CMPXCHG instruction is using the data storage location. For instance, in an example scenario where the "destination" data storage location is an eight-byte data structure, all 64 bits of the eight-byte data structure are prevented from being accessed (e.g., read or written) by a different thread. As another example, when the "destination" data storage location is a 16-byte data structure, all 128 bits of the 16-bit data structure are prevented from being accessed by a different thread. Such access prevention introduces unnecessarily delay and computational resource overhead in a scenario where a thread performing CMPXCHG only cares about a first subset of bits in a data structure and a different thread only cares about a second subset of bits in the data structure that does not overlap the first subset of bits (e.g., when different threads need separate, non-overlapping parts of a common data structure).

To address these shortcomings facing conventional CMPXCHG instructions, a masked atomic update instruction is described. The masked atomic update instruction, which may interchangeably be referred to as a Masked Compare and Exchange (CMPXCHGM) instruction atomically performs compare and exchange operations on select bits of a data structure. Specifically, the masked atomic update instruction compares respective source values with respective values of bits stored at a defined destination location. If the respective bit values match, the masked atomic update instruction replaces one or more of the respective bit values at the destination location with one or more defined replacement values for the particular computational task being performed. Alternatively, if the respective bit values do not match, the destination value is not modified.

In contrast to the conventional CMPXCHG instruction, however, the masked atomic update instruction described herein enables a processing unit to mask out bits of the destination storage location that are not involved (e.g., that are not compared or exchanged) when performing the masked atomic update instruction. In this manner, the masked atomic update instruction is configured to prevent access to less than an entirety of the destination storage location (e.g., by another thread while the masked atomic update instruction is being executed). The masked atomic update instruction thus provides bit-level granularity by which another thread is prevented from accessing bits associated with a data storage location. This bit-level granularity advantageously permits multiple threads to access and modify a common data storage location while ensuring atomicity, which is not possible using conventional approaches and systems. In this manner, the techniques described herein enable hardware platforms to realize technical advantages not afforded by conventional system architectures (e.g., decreased power consumption, decreased latency, additional bandwidth, and so forth).

In some aspects, the techniques described herein relate to a system including a circuit board having memory mounted to the circuit board, and a processing unit configured to obtain a data structure that includes multiple fields from the memory, compare a subset of the multiple fields to at least one source value specified by a masked atomic update instruction, and in response to the subset of the multiple fields matching the at least one source value, modifying the data structure using at least one replacement value specified by the masked atomic update instruction.

In some aspects, the techniques described herein relate to a system, wherein the processing unit is configured to obtain the data structure by transmitting a memory request for data stored in the memory to the circuit board, and in response to transmitting the memory request, causing the data structure to be returned to the processing unit.

In some aspects, the techniques described herein relate to a system, wherein in response to transmitting the memory request, the processing unit is configured to cause the subset of the multiple fields to be returned to the processing unit.

In some aspects, the techniques described herein relate to a system, wherein the multiple fields are configured as storing a first number of bits and wherein the subset of the multiple fields is configured as storing a second number of bits that is smaller than the first number of bits.

In some aspects, the techniques described herein relate to a system, wherein the subset of the multiple fields is defined by a mask that describes a position for each of the subset of the multiple fields relative to the multiple fields of the data structure.

In some aspects, the techniques described herein relate to a system, wherein the processing unit is further configured to permit a different processing unit to access, from the data structure, fields excluded from the subset of the multiple fields during the comparing the subset of the multiple fields to the at least one source value and during the modifying the data structure using the at least one replacement value.

In some aspects, the techniques described herein relate to a system, wherein the processing unit is further configured to permit a different processing unit to access the multiple fields of the data structure in response to modifying the data structure using the at least one replacement value.

In some aspects, the techniques described herein relate to a system, wherein modifying the data structure using the at least one replacement value includes modifying at least one field of the subset of the multiple fields.

In some aspects, the techniques described herein relate to a system, wherein modifying the data structure using the at least one replacement value is performed independent of modifying a field of the data structure that is not included in the subset of the multiple fields.

In some aspects, the techniques described herein relate to a system, wherein the processing unit is further configured to not modify the data structure in response to the multiple fields not matching the at least one source value.

In some aspects, the techniques described herein relate to a system, wherein the at least one source value includes multiple source values, the multiple sources values including a corresponding source value for each data field in the subset of the multiple fields.

In some aspects, the techniques described herein relate to a system, wherein the processing unit is configured to compare the subset of the multiple fields and modify the data structure independent of a lock on the data structure.

In some aspects, the techniques described herein relate to a system, wherein the processing unit is configured to obtain the data structure, compare the subset of the multiple fields to the at least one source value, and modify the data structure using the at least one replacement value as part of executing the masked atomic update instruction, wherein the masked atomic update instruction specifies the at least one source value, the at least one replacement value, a destination address for the data structure, and a mask that defines the subset of the multiple fields.

In some aspects, the techniques described herein relate to a system including a circuit board having memory mounted to the circuit board, a first processing unit, and a second processing unit configured to execute a masked atomic update instruction by comparing a subset of multiple fields of a data structure to at least one source value specified by the masked atomic update instruction, and modifying the data structure using at least one replacement value specified by the masked atomic update instruction in response to the subset of the multiple fields matching the at least one source value, or not modifying the data structure in response to the subset of the multiple fields not matching the at least one source value, and the second processing unit further configured to prevent the first processing unit from modifying the subset of the multiple fields of the data structure while executing the masked atomic update instruction.

In some aspects, the techniques described herein relate to a system, wherein the first processing unit is configured to modify fields of the data structure that are not included in the subset of the multiple fields while the second processing unit is executing the masked atomic update instruction.

In some aspects, the techniques described herein relate to a system, wherein the second processing unit is configured to execute the masked atomic update instruction independent of locking the data structure.

In some aspects, the techniques described herein relate to a system, wherein the first processing unit is configured to modify the subset of the multiple fields in response to the second processing unit completing execution of the masked atomic update instruction.

In some aspects, the techniques described herein relate to a device including a processing unit configured to receive a masked atomic update instruction that includes information describing an address for a data storage location, at least one source value, at least one replacement value, and a mask, and execute the masked atomic update instruction by identifying, from a data structure associated with the data storage location, a subset of multiple data fields using the mask, comparing the subset of the multiple data fields to the at least one source value, and modifying the data structure using the at least one replacement value in response to the subset of the multiple data fields matching the at least one source value, or not modifying the data structure in response to the subset of the multiple data fields not matching the at least one source value.

In some aspects, the techniques described herein relate to a device, wherein the processing unit is further configured to prevent a different processing unit from accessing the subset of the multiple data fields during the executing the masked atomic update instruction.

In some aspects, the techniques described herein relate to a device, wherein the processing unit is further configured to allow the different processing unit to access, from the data storage location, data fields that are excluded from the subset of the multiple data fields during the executing the masked atomic update instruction.

FIG. 1 is a block diagram of a non-limiting example system 100 having a hardware platform that is operable to implement masked atomic update instructions. In this example, the system 100 includes hardware platform 102 as well as virtual machine monitor 104, one or more virtual machines 106, one or more framework-secure virtual machines 108, and root framework-secure virtual machine 110, which are run on the hardware platform 102.

In this example, the hardware platform 102 is depicted including data fabric 112, one or more processing units 114, embedded security processor 116, one or more memories 118, and memory controller 120. Thus, in accordance with the described techniques, one or more of the virtual machine monitor 104, a virtual machine 106, a framework-secure virtual machine 108, and/or a root framework-secure virtual machine 110 operate by utilizing one or more of the underlying resources of the hardware platform 102 (e.g., one or more of the data fabric 112, a processing unit 114, the embedded security processor 116, a memory 118, or the memory controller 120). In one or more implementations, one or more isolated regions of the memory 118 (e.g., isolated memory region 122) are involved when implementing the masked atomic update instructions described herein.

In variations, the hardware platform 102 includes more, fewer, and/or different hardware components without departing from the spirit or scope of the described techniques (e.g., cache, secondary storage, semiconductor intellectual property (IP) core, and so forth). Additionally, throughout the following description various components of the system 100 are referred to in the singular and/or in the plural, such as the hardware platform 102, the abovementioned components of the hardware platform 102 (e.g., one or more processing units 114), the virtual machine monitor 104, the virtual machine 106, the framework-secure virtual machine 108, and/or the root framework-secure virtual machine 110. In implementations, however, the number of such components used to implement the described techniques varies without departing from the spirit or scope of the described techniques. While use of one, single embedded security processor 116 and one, single root framework-secure virtual machine 110 is discussed throughout, in at least one variation, multiple security processors and/or multiple root framework-secure virtual machines are used to implement the described techniques, such as in connection with multiple hardware platforms (e.g., used at a data center and/or by a web service provider).

In the illustrated example, the above-described components (e.g., the data fabric 112, the one or more processing units 114, the one or more memories 118, the embedded security processor 116, the memory controller 120, etc.) are depicted as being included in the hardware platform 102. Examples of the hardware platform 102 include, but are not limited to, one or more of a system-on-chip (SoC) or a system-on-package (SoP).

In accordance with the described techniques, one or more of the processing unit 114, the embedded security processor 116, the memory 118, and/or the memory controller are coupled to one another via one or more of a wired or wireless connection (e.g., implemented using the data fabric 112). Example wired connections include, but are not limited to, memory channels, buses (e.g., a data bus, a system or address bus), interconnects, through silicon vias, traces, and planes. Other example connections include optical connections, fiber optic connections, and/or connections or links based on quantum entanglement.

Examples of devices or apparatuses in which the system 100 is implemented include, but are not limited to, one or more server computers, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and other computing devices or systems.

The processing unit 114 is an electronic circuit that performs various operations on and/or using data in the memory 118. Examples of the processing unit 114 include, but are not limited to, a central processing unit (CPU), a graphics processing unit (GPU), a field programmable gate array (FPGA), an accelerator, an accelerated processing unit (APU), and a digital signal processor (DSP), to name a few. In at least one variation, the processing units 114 of the hardware platform 102 are all of a same type (e.g., all CPUs, all a same model of CPUs, all GPUs, etc.). Alternatively, the hardware platform 102 includes at least two different types of processing units 114 (e.g., at least one CPU and at least one GPU, two different types of CPUs, combinations thereof, and so forth).

The memory 118 is a device or system that is used to store information, such as for immediate use in a device by the processing unit 114 or by an in-memory processor (not depicted in FIG. 1), which is referred to as a processing-in-memory component or PIM component. In one or more implementations, the memory 118 corresponds to semiconductor memory where data is stored within memory cells on one or more integrated circuits. In at least one example, the memory 118 corresponds to or includes volatile memory, examples of which include random-access memory (RAM), dynamic random-access memory (DRAM), synchronous dynamic random-access memory (SDRAM), static random-access memory (SRAM), and memristors.

The memory 118 is packaged or configured in any of a variety of different manners. Examples of such packaging or configuring include a dual in-line memory module (DIMM), a small outline DIMM (SO-DIMM), a registered DIMM (RDIMM), a non-volatile DIMM (NVDIMM), a ball grid array (BGA) memory permanently attached to (e.g., soldered to, mounted to, etc.) the hardware platform 102 (or other printed circuit board), combinations thereof, and so forth.

Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the memory 118 is configured as or includes a SO-DIMM or an RDIMM according to one of the above-mentioned standards (e.g., DDR, DDR2, DDR3, DDR4, and DDR5).

Alternatively or in addition, the memory 118 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). The memory 118 is configurable in a variety of ways capable of supporting thermal management using an adjustable thermal management algorithm and/or receiving power managed using such an adjustable algorithm.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the memory 118 is configurable in a variety of ways without departing from the spirit or scope of the described techniques.

In at least one variation, the memories 118 of the hardware platform 102 are all of a same type (e.g., all DRAMs, all a same model of DRAMs, all MRAM, etc.). Alternatively, the hardware platform 102 includes at least two different types of processing units 114 (e.g., at least one DRAM and a cache system, two different types of DRAM, combinations thereof, and so forth).

The memory controller 120 is a hardware component or subsystem that manages the flow of data to and from the memory 118. By way of example, the memory controller 120 includes logic to read and write to the memory 118 and interface with the processing unit 114. In one or more implementations, the memory controller 120 also includes logic to read and write to various levels of a cache hierarchy (not shown). For instance, the memory controller 120 receives instructions from the processing unit 114, which involve accessing the memory 118, and the memory controller 120 provides data from the memory 118 to the processing unit 114 (e.g., for processing by the processing unit 114). In one or more implementations, the memory controller 120 is communicatively and/or topologically located between the processing unit 114 and the memory 118, and the memory controller 120 interfaces with both the processing unit 114 and the memory 118.

The virtual machine monitor 104 is a software and/or hardware component that virtualizes the physical computer hardware of the hardware platform 102. The virtual machine monitor 104 allocates and manages physical resources of the hardware platform 102 to run one or more virtualized instances of a computer (i.e., virtual machines) on the hardware platform 102. The underlying computing device(s) (e.g., the hardware platform 102) utilized by a virtual machine monitor to instantiate virtual machines is often referred to as a "host." In the context of the system 100, the virtual machine monitor 104 allocates and manages physical resources of the hardware platform 102, such as the processing unit 114, the embedded security processor 116, the memory 118, and/or the memory controller 120 to instantiate and/or manage one or more virtual machines. A virtual machine monitor is also referred to as a "hypervisor," examples of which are a Type 1 Hypervisor (e.g., a baremetal hypervisor) and a Type-2 Hypervisor (e.g., a hosted hypervisor).

In one or more implementations, a "virtual machine" is the virtualization or emulation of a computer system to provide the functionality of the physical computer system. In variations, virtual systems are the virtualization or emulation of computer systems having a range of functionality, for instance, from providing a substitute of a real machine (e.g., being instantiated with the resources used to execute an entire operating system) to executing a computer program in a platform independent manner. In implementations, the capabilities of virtual machines and/or of different virtual machines differs without departing from the spirit or scope of the described techniques.

In accordance with the described techniques, each of the one or more virtual machines 106, the one or more framework-secure virtual machines 108, and the root framework-secure virtual machine 110 is a "virtual machine."

However, the one or more virtual machines 106, the one or more framework-secure virtual machines 108, and the root framework-secure virtual machine 110 represent instantiations having different characteristics (e.g., deployed in accordance with a security framework) and/or having different functionalities (e.g., managing deployment of the security framework). In one or more implementations, the one or more virtual machines 106 are instantiated by the virtual machine monitor 104 using the underlying resources of the hardware platform 102, but security of the one or more virtual machines 106 is not managed according to a particular security framework.

One example of the security framework is Secure Encrypted Virtualization-Secure Nested Paging (SEV-SNP). The SEV-SNP framework builds upon SEV and SEV-ES (Encrypted State) functionality while adding new hardware-based security protections. For instance, SEV-SNP adds strong memory integrity protection to prevent malicious hypervisor-based attacks like data replay, memory re-mapping, and more in order to create an isolated execution environment. SEV-SNP also introduces several additional optional security enhancements designed to support additional virtual machine use models stronger protection around interrupt behavior, and offers increases protection against side channel attacks, to name a few enhancements. In implementations, the particular security framework differs from SEV-SNP without departing from the described techniques.

In contrast to the one or more virtual machines 106, which are not instantiated or otherwise managed according to the particular security framework (e.g., SEV-SNP), the one or more framework-secure virtual machines 108 and the root framework-secure virtual machine 110 are implemented in accordance with the particular security technique. Further, the root framework-secure virtual machine 110 differs from the one or more framework-secure virtual machines 108 insofar as the root framework-secure virtual machine 110 is configured with elevated permissions (e.g., to access one or more portions of the hardware platform 102) and is operable to control various accesses of one or more portions of the hardware platform 102 by the one or more framework-secure virtual machines 108.

In conventional approaches, some security frameworks are implemented using the embedded security processor 116 and/or without the use of a root framework-secure virtual machine 110. By way of example, conventional SEV-SNP approaches perform guest management and trusted input output (I/O)—management of virtual machines within the security framework such as the one or more framework-secure virtual machines 108—using the embedded security processor 116. In one or more variations, though, the embedded security processor 116 is a slower (e.g., significantly slower) processor than the processing unit 114, which in one or more variations is implemented according to a family of complex instruction set computer (CISC) instruction set architectures, such as x86. Compared to a processing unit 114 implemented according to such an instruction set architecture, for instance, the embedded security processor 116 has limited compute and memory resources. The embedded security processor 116 also has higher latency when accessing system memory (e.g., the memory 118) relative to the processing unit 114, which decreases the throughput of the embedded security processor 116 when the embedded security processor 116 reads and writes into the system memory during management of the one or more framework-secure virtual machines 108 and during other functions. These differences contribute to higher latency in SEV-SNP security services provided by the embedded security processor 116. Moreover, performance (e.g., throughput) and scaling issues are exacerbated as the number of virtual machines deployed (e.g., by the virtual machine monitor 104) increases, such as with a number of core counts of newer platform hardware (e.g., processing units with more cores) and/or as new security features are added to keep up with evolving data center regulations.

In contrast to conventional approaches, the root framework-secure virtual machine 110 is instantiated and works in concert with the embedded security processor 116 and the virtual machine monitor 104 to implement the security framework (e.g., SEV-SNP). Because the root framework-secure virtual machine 110 is allowed to run management of the one or more framework-secure virtual machines 108 and/or trusted input/output (TIO) using the processing unit 114 (e.g., in x86), the described system 100 improves performance (e.g., increased throughput, reduced latency, etc.) of the particular security framework (e.g., SEV-SNP) relative to conventional systems. Moreover, the described system 100 also enables security features of the security framework to be easily scaled, such as to support various protocols including secure compute express link (CXL), graphics processing unit (GPU) support, and so on.

The illustrated example also depicts communication interfaces between various depicted components, including an interface 124, an interface 126, an interface 128, and an interface 130. In one or more implementations, the interface 124, the interface 126, the interface 128, and the interface 130 are at least, in part, activated and/or managed during runtime by the virtual machine monitor 104, which leverages various code of the virtual machine monitor 104 (e.g., hypervisor), and according to the particular security framework (e.g., SEV-SNP). In one or more implementations, the interface 126 and the interface 128 are secured according to the particular security framework (e.g., those interfaces are encrypted), such that the virtual machine monitor 104 cannot access (e.g., "see") the data being communicated across those interfaces even though the virtual machine monitor 104 facilitates communication of such. In contrast, the interface 124 and the interface 130 are not secured in the same manner, (e.g., interface 124 and interface 130 are not encrypted). In one or more implementations, the interface 124 and the interface 130 are cleartext interfaces.

In one or more implementations, the interface 124 is used for communication of commands of the root framework-secure virtual machine 110 that are available to the virtual machine monitor 104 for management of the one or more framework-secure virtual machines 108. In one or more implementations, the interface 126 is used for communication of messages from the one or more framework-secure virtual machines 108 to the root framework-secure virtual machine 110. In one or more implementations, the interface 128 is used for communication of messages from the root framework-secure virtual machine 110 to the firmware 132 of the embedded security processor 116. In one or more implementations, the interface 130 is used for communication of firmware 132 commands to initialize the security framework and for management (e.g., initialization, runtime management, and shutdown) of the root framework-secure virtual machine 110. The various messages communicated across those interfaces are discussed in more detail below.

The system 100 discussed above and below improves performance of a particular security framework (e.g., SEV-SNP) by moving management of the one or more framework-secure virtual machines 108, trusted I/O, and other security functions from firmware 132 of the embedded security processor 116 into hardware-protected software (e.g., the root framework-secure virtual machine 110) executing on an x86 processor, e.g., the processing unit 114. The described techniques include a set of hardware and firmware mechanisms, and system interfaces (e.g., the interfaces 124-130), to enable the root framework-secure virtual machine 110, a privileged SNP virtual machine, to perform secure virtual machine management. The improvement leverages existing SEV-SNP protections such as reverse mapping table, memory encryption and I/O protections, to protect root framework-secure virtual machine 110's execution and provides special privileges via the following processing unit 114 (e.g., CPU) and firmware capabilities.

In one or more implementations, the capabilities of the processing unit 114 and the firmware 132 of the embedded security processor 116 include establishing the run time identity of the root framework-secure virtual machine 110 and locking the identity, allowing the root framework-secure virtual machine 110 to leverage the identity of a framework-secure virtual machine 108 for reading/writing pages of the target framework-secure virtual machine, allowing the root framework-secure virtual machine 110 to read/write into locations of the memory 118 (e.g., the isolated memory region 122) that are not available to any x86 software where examples of those locations include reverse mapping tables (RMP) and fenced memory regions outside the system memory, performing an atomic update of RMP entries without bit masking, perform translation lookaside buffer (TLB) flushing for one or more framework-secure virtual machines 108, securely load and update software of the root framework-secure virtual machine 110, and establishing an interface between the root framework-secure virtual machine 110 and the embedded security processor 116.

While root framework-secure virtual machine 110 is identified by its address space identifier (ASID), similar to the one or more framework-secure virtual machines 108, the security-framework firmware 132 (e.g., implemented by the embedded security processor 116) establishes it as the root framework-secure virtual machine 110 with unique privileges by writing the ASID of the root framework-secure virtual machine 110 into a location of the memory 118 that is only accessible to the processing unit 114 (e.g., executing the code to implement the root framework-secure virtual machine 110) and the security-framework firmware 132. This is done only after the security-framework firmware 132 has verified the root framework-secure virtual machine 110's identity by reading an identity block of the root framework-secure virtual machine 110, which is initiated by the root framework-secure virtual machine 110 itself during initialization. Once the ASID of the root framework-secure virtual machine 110 is written in the fenced memory location (e.g., isolated memory region 122), only the root framework-secure virtual machine 110 can clear its ASID at the time the root framework-secure virtual machine 110 is shutdown. The processing unit 114 (e.g., CPU) executing the code to implement the root framework-secure virtual machine 110 checks if the ASID of the root framework-secure virtual machine 110 matches the ASID of the currently running framework secure virtual machine and grants the currently running machine special privileges only if the ASID matches.

When the root framework-secure virtual machine 110 is set to read or write a private pages of a target framework-secure virtual machine 108, the processing unit 114 uses the ASID of the target framework-secure virtual machine 108 and also uses system physical address (SPA) of the page of the target framework-secure virtual machine 108. The root framework-secure virtual machine 110 provides the ASID of the target framework-secure virtual machine 108 to the processing unit 114 via a register, such as via a write to a model-specific register (e.g., a target ASID model-specific register (MSR)).

In one or more implementations, the root framework-secure virtual machine 110 tags the target framework-secure virtual machine 108 using a special encoding in a guest page table of the root framework-secure virtual machine 110 to inform the processing unit 114 which page in the table corresponds to the target framework-secure virtual machine 108. The root framework-secure virtual machine 110 does this by causing a new software-visible bit called the T-bit to be set, such as by setting the bit to 1. The root framework-secure virtual machine 110 also sets the guest physical address (GPA) of the page to be same as the system physical address. If the "current" framework secure virtual machine corresponds to the root framework-secure virtual machine 110, then processing unit 114 checks the T-bit and a C-bit (cypher text bit) to determine whether the page is a page of a target framework secure virtual machine 108. If both bits are 1, then the root framework-secure virtual machine 110 skips the nested page table (NPT) walk and uses ASID of the target one or more framework-secure virtual machines 108 in the model-specific register (MSR) to read that page. Throughout the description, the term "guest" refers to a framework secure virtual machine, such as the one or more framework-secure virtual machines 108 and/or the root framework-secure virtual machine 110. Accordingly, the term "guest" is used interchangeably with the term "framework-secure virtual machine"in some instances.

A new instruction for the root framework-secure virtual machine 110-referred to interchangeably as "root instruction" or an instruction of the root framework-secure virtual machine 110—supports read and write operations to allow the root framework-secure virtual machine 110 to read/write to locations in the memory 118 that are not available to at least some software (e.g., x86 software). This enables root framework-secure virtual machine 110 to read reverse mapping table entries and memory locations in fenced memory regions (e.g., the isolated memory region 122). The root instruction further supports a masked atomic update instruction (CMPXCHGM), which allows root framework-secure virtual machine 110 to perform atomic update operations with bit-granularity masking, as described in further detail below with respect to FIGS. 2-4.

A broadcast translation lookaside buffer (TLB) flushing instruction is modified to allow the root framework-secure virtual machine 110 to perform TLB invalidation for any framework-secure virtual machines 108 globally. If the current framework-secure virtual machine is the root framework-secure virtual machine 110, the broadcast TLB flushing instruction will use the input ASID even if it is different than the current ASID instead of replacing the input ASID with the current guest ASID, which is the behavior with the framework-secure virtual machines 108.

The existing flows for launching a framework-secure virtual machine 108 are modified to detect the root framework-secure virtual machine 110's identity during the launch process by verifying that the code of the root framework-secure virtual machine 110 is signed and has expected version numbers (e.g., including the security version number (SVN)). In accordance with the particular security framework, the identify of the root framework-secure virtual machine 110 is stored in the firmware 132 of the embedded security processor 116. When the root framework-secure virtual machine 110 is first run by the virtual machine monitor 104 using a utility and/or command (e.g., VMRUN), the root framework-secure virtual machine 110 calls an initialization function in the firmware 132 (e.g., of the embedded security processor 116) which establishes the root framework-secure virtual machine 110's identity for a processing unit 114's use by writing the identity into a location that is accessible to the processing unit 114 and the firmware 132 only. The root framework-secure virtual machine 110 clears memory of the processing unit 114 used to store the ASID of the root framework-secure virtual machine 110 when the root framework-secure virtual machine 110 is terminated.

The interface 128 between the root framework-secure virtual machine 110 and the embedded security processor 116 allows the root framework-secure virtual machine 110 to provide the commands via the root framework-secure virtual machine 110's private pages and for the firmware 132 of the embedded security processor 116 to return a response by writing the response directly into a private page of the root framework-secure virtual machine 110 instead of using an existing message based protocol between the one or more framework-secure virtual machines 108 and firmware 132 of the security framework (e.g., on the embedded security processor 116).

In at least one implementation, the modifications to the architecture of system 100 leverages the security framework (e.g., SNP) architecture to host a trusted software-implemented module (e.g., executed code or binary at least one processing unit 114) as a privileged root virtual machine (e.g., root framework-secure virtual machine 110). Further, the root framework-secure virtual machine 110 is protected using hardware security enforcements such as reverse mapping table protection and memory encryption.

In one or more implementations, the root framework-secure virtual machine 110 is signed by an authority, is authenticated and loaded securely by the embedded security processor 116, has strong hardware enforced identity that can be checked by processing unit 114 and the firmware 132 before granting the root framework-secure virtual machine 110 special privileges, has special hardware privileges that allows the root framework-secure virtual machine 110 to perform guest management, trusted I/O and other functions, is in the trusted computing base (TCB) of all framework-secure virtual machines 108 and is included in attestation of framework-secure virtual machines 108.

In one or more implementations, the described system 100 redistributes responsibilities relative to conventional techniques leveraging the security framework to improve scalability and reduce latency, among other improvements. In one or more implementations, for example, the functions of the embedded security processor 116, after redistribution, include initialization and shutdown of the security framework; configuring cores, memory encryption engines, and the input/output (I/O) memory management unit (IOMMU); initializing reverse mapping tables (RMP) and micro-architectural structures; security framework trusted I/O (e.g., SEV-TIO initialization); trusted computing base (TCB) and attestation key management, management of the root framework-secure virtual machine 110, low level hardware functions for guest and trusted input/output (I/O), which is also referred to as "TIO" management, and programming framework secure virtual machine keys in UMC, integrity and data encryption key in RC, flushing data fabric.

In one or more implementations, the functions of the root framework-secure virtual machine 110, after redistribution, include management of the one or more framework-secure virtual machines 108; launching, activating, and decommissioning the one or more framework-secure virtual machines 108; runtime management (e.g., page swap, move, unsmash, reclaim, etc.); operation as a migration service; handling of security framework trusted I/O (e.g., SEV-TIO handling); trusted execution environment (TEE) device interface security protocol (TDISP) handling (e.g., secure protocol and data model (SPDM), integrity and data encryption key management); TEE device interface (TDI) management; enhancements to the security framework; handling of secure CXL memory/accelerators, scalable I/O virtualization (SIOV) and others; and can act as a device security manager for integrated devices such as DACC.

Figure 2:
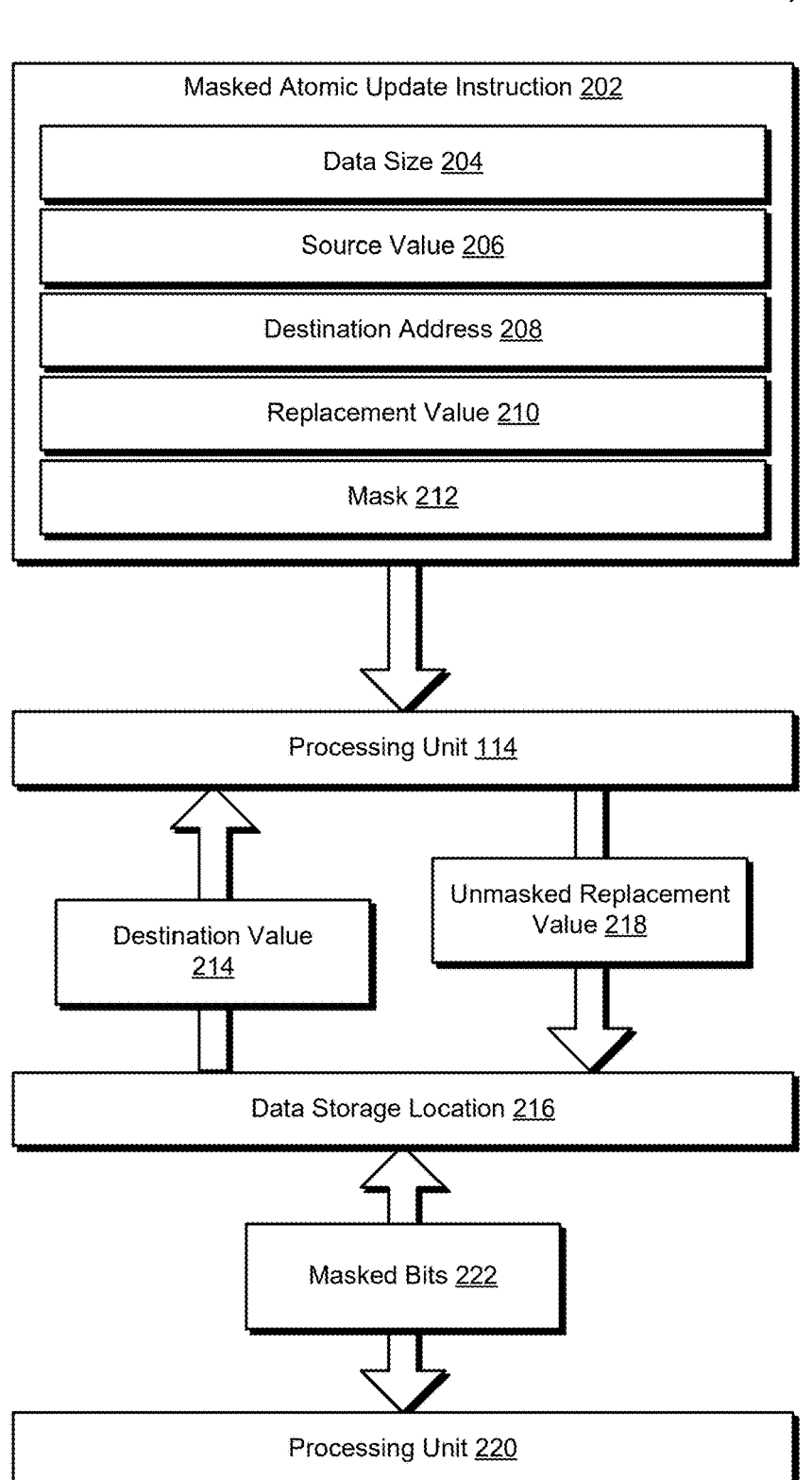
FIG. 2 is a block diagram of a non-limiting example system showing the hardware platform of FIG. 1 in greater detail as executing a masked atomic update instruction.

FIG. 2 is a block diagram of a non-limiting example system 200 showing the hardware platform of FIG. 1 in greater detail as executing a masked atomic update instruction using techniques described herein. Specifically, FIG. 2 depicts a processing unit 114 of the hardware platform 102 of FIG. 1 as receiving a masked atomic update instruction 202. In accordance with one or more implementations, the masked atomic update instruction 202 is received from the one or more virtual machines 106, the one or more framework-secure virtual machines 108, or the root framework-secure virtual machine 110 as part of executing a thread for a computational task. Although described herein as being implemented in the context of a root instruction for the root framework-secure virtual machine 110, the masked atomic update instruction 202 is not so limited to virtual machine implementations, and is configured for execution by the processing unit 114 independent of any one or more virtual machines. For instance, in some implementations the masked atomic update instruction 202 is executed by the processing unit 114 as part of a computational task being executed by the hardware platform 102, by one or more computing systems communicatively coupled to the hardware platform 102, combinations thereof, and so forth.

As illustrated in FIG. 2, the masked atomic update instruction 202 includes information specifying a data size 204 of a data block associated with a destination address (e.g., a region in memory 118, a data block in isolated memory region 122, etc.). In some implementations, the data size 204 for the data block associated with the destination address is explicitly defined by the masked atomic update instruction 202 (e.g., 8 bytes, 16 bytes, and so forth). Alternatively, in some implementations the data size 204 is not explicitly specified by the masked atomic update instruction 202 and is identified by the processing unit 114 based on the destination address (e.g., identified based on the destination address corresponding to a region in memory 118 known to be segmented into 8-byte blocks).

The masked atomic update instruction 202 further includes at least one source value 206, a destination address 208, at least one replacement value 210, and a mask 212. The at least one source value 206 represents one or more numerical values that are to be compared against corresponding numerical values stored at the destination address 208 when executing the masked atomic update instruction 202. For instance, in an example scenario where the destination address 208 represents a data storage location for an 8-byte block of data, the at least one source value 206 is similarly configured as an 8-byte block of data, where respective values of the source and destination data blocks are compared against one another during execution of the masked atomic update instruction 202. In some implementations, the processing unit 114 stores the at least one source value 206 locally (e.g., in one or more registers of the processing unit 114) upon receipt of the masked atomic update instruction 202.

The at least one replacement value 210 represents one or more numerical values that are written to (e.g., stored at) the destination address 208 if a comparison of the at least one source value 206 to data maintained at the destination address 208 match (e.g., if numerical values at corresponding positions in the source and destination blocks of data are respectively equivalent to one another). The mask 212 represents a technical advantage that differentiates the masked atomic update instruction 202 from a conventional CMPXCHG instruction, and includes information identifying one or more bits in the block of data associated with the destination address 208 that are not compared or exchanged as part of executing the masked atomic update instruction 202. In at least one implementation, the mask 212 defines respective positions for data bits in the block of data identified by the destination address 208 that are to be ignored during performance of the masked atomic update instruction 202. Similarly, the mask 212 defines respective positions for data bits in the at least one source value 206 and the at least one replacement value 210 that are not involved in the masked atomic update instruction 202.

In this manner, the mask 212 ensures that only relevant (e.g., computationally significant) data bits stored at the destination address 208 are compared against only relevant data bits in the at least one source value 206 and/or updated by the at least one replacement value 210. In at least one implementation, the mask 212 is configured as a block of data having the data size 204 of the destination address 208 and includes either a "1" or a "0" value for each bit in the data block associated with the destination address 208 (e.g., "1" to indicate that the bit is significant and involved in the masked atomic update instruction 202 and "0" to indicate that the bit should be "masked out" (i.e., ignored) while executing the masked atomic update instruction 202, or vice versa).

As part of executing the masked atomic update instruction 202, the processing unit 114 obtains at least one destination value 214 from a data storage location 216 associated with (e.g., identified by) the destination address 208. For instance, the processing unit 114 transmits a request to the memory controller 120 for access to a data block in memory 118 (e.g., the data storage location 216) identified by the destination address 208. In the illustrated example of FIG. 2, the memory request is granted and the at least one destination value 214 is returned to the processing unit 114 from the data storage location 216. The processing unit 114 then compares each non-masked bit (e.g., as defined by the mask 212) included in the at least one source value 206 to a corresponding non-masked bit in the at least one destination value 214 (e.g., compares, for each respective non-masked bit position represented by the source value 206, a value of a corresponding non-masked bit position represented by the destination value 214). In response to the at least one source value 206 matching the at least one destination value 214, the processing unit 114 updates the data storage location 216 by writing at least one unmasked replacement value 218 to the data storage location 216.

For instance, in response to comparing each bit of the source value 206 not masked out by the mask 212 with a corresponding bit of the destination value 214 not masked out by the mask 212 and determining that each compared bit pair includes equal numerical values, the processing unit 114 identifies that the at least one source value 206 matches the at least one destination value 214. Upon identifying that the at least one source value 206 matches the at least one destination value 214, the processing unit 114 applies the mask 212 to the at least one replacement value 210 and writes unmasked bits of the at least one replacement value 210 (e.g., bits of the at least one replacement value 210 that are not masked out by the mask 212, defined as "the at least one unmasked replacement value 218") to the data storage location 216. Alternatively, in response to the at least one source value 206 not matching the at least one destination value 214, the at least one destination value 214 remains unmodified at the data storage location 216 following completion of executing the masked atomic update instruction 202.

By including the mask 212, the masked atomic update instruction 202 permits for the processing unit 114 to atomically compare the at least one source value 206 and the at least one destination value 214 and optionally update the data storage location 216 with the at least one unmasked replacement value 218 if the at least one source value 206 matches the at least one destination value 214. In this manner, the masked atomic update instruction 202 ensures that no bits involved in the comparison or exchange (e.g., update of the data storage location 216 with the at least one unmasked replacement value 218) are modified (e.g., written), accessed (e.g., read), or otherwise interrupted by a different thread or computational unit. In contrast to conventional compare and exchange instructions, however, the masked atomic update instruction 202 enables a different processing unit, such as processing unit 220, to access bits of the data storage location 216 that are "masked out" by the mask 212.

In the illustrated example of FIG. 2, bits that are masked out by the mask 212, and thus indicated as not involved in executing the masked atomic update instruction 202, are represented as masked bits 222. In some implementations, the processing unit 114 places a lock on data fields (e.g., bits) of the data storage location 216 other than the masked bits 222 to prevent access by another thread or processing unit while executing the masked atomic update instruction 202. Alternatively, in some implementations the masked atomic update instruction 202 is executed independent of (e.g., without) placing a lock on one or more data fields of the data storage location 216. In such lock-independent implementations, the processing unit 114 informs the memory controller 120 as to which data fields of the data storage location 216 are masked out by the mask 212 and thus permitted to be accessed as masked bits 222 by the different processing unit 220. In accordance with one or more lock-independent implementations, the processing unit 114 implements synchronization techniques (e.g., using counters) to ensure exclusive access to bits of the data storage location 216 other than the masked bits 222 masked out by the mask 212.

The processing unit 220 is representative of a different processing unit 114 of the hardware platform 102 (e.g., a processing unit 114 other than the processing unit 114 executing the masked atomic update instruction 202). In this manner, the masked atomic update instruction 202 ensures atomic performance of the compare and (possible) exchange of significant bits stored in a block of data identified by the destination address 208 (e.g., the data storage location 216) while permitting a different thread (e.g., a thread executed by the processing unit 220) to simultaneously access data bits from the data storage location 216 that are not considered by the masked atomic update instruction 202 (e.g., the masked bits 222). The masked atomic update instruction 202 thus provides bit-level granularity by which another thread or processing unit is prevented from accessing bits associated with a data storage location. Such bit-level granularity advantageously permits multiple threads to access and modify a common data storage location while ensuring atomicity, which is not possible using conventional approaches and systems.

FIG. 3 is a block diagram of a non-limiting example procedure 300 describing performance of executing a masked atomic update instruction.

To begin, a masked atomic update instruction is received (block 302). The processing unit 114, for instance, receives the masked atomic update instruction 202 (e.g., from the root framework-secure virtual machine 110, from code of a computational task being executed locally by the processing unit 114, or the like). At least one data field associated with a destination address specified by the masked atomic update instruction is masked (block 304). The processing unit 114, for instance, identifies a data size 204 of the destination address 208 specified by the masked atomic update instruction 202 and applies the mask 212 to exclude data fields (e.g., bits) of the data storage location 216 that are not compared or exchanged as part of executing the masked atomic update instruction 202.

At least one unmasked data field is obtained from the destination address (block 306). The processing unit 114 for instance, requests from the data storage location 216 associated with the destination address 208 bits other than the masked bits 222 and receives the requested data as the at least one destination value 214. Alternatively, in some implementations the processing unit 114 requests an entirety of the data block represented by the data storage location 216, such that the at least one destination value 214 represents the portion of the data storage location 216 identified by the destination address 208 and locally (e.g., at the processing unit 114) applies the mask 212 to differentiate computationally significant bits from the masked bits 222.

A determination is then made as to whether one or more unmasked data fields match source data specified by the masked atomic update instruction (block 308). The processing unit 114, for instance, compares each bit represented by the at least one source value 206 to each bit represented by the at least one destination value 214 that is not masked out by the mask 212. In response to the at least one source value 206 matching the at least one destination value 214 (e.g., a "Yes" determination at block 308), at least one masked replacement value specified by the masked atomic update instruction is written to the destination address (block 310). The processing unit 114, for instance, writes the at least one unmasked replacement value 218 to the data storage location 216 when the at least one source value 206 matches the at least one destination value 214. After updating the data storage location 216 using the at least one unmasked replacement value 218, execution of the masked atomic update instruction 202 ends, at which time a different processing unit is permitted to access an entirety of the data storage location 216.

Alternatively, in response to the at least one source value 206 not matching the at least one destination value 214 (e.g., a "No" determination at block 308), the processing unit 114 does not modify data fields associated with the destination address (block 312). The processing unit 114, for instance, does not exchange the at least one destination value 214 with the at least one unmasked replacement value 218 and execution of the masked atomic update instruction 202 ends, at which time a different processing unit is permitted to access an entirety of the data storage location 216.

FIG. 4 is a block diagram of a non-limiting example procedure 400 describing permitting access by different processing units to data stored at a common destination address while one processing unit executes a masked atomic update instruction. To begin, a masked atomic update instruction is received (block 402). The processing unit 114, for instance, receives the masked atomic update instruction 202 (e.g., from the root framework-secure virtual machine 110, from code of a computational task being executed locally by the processing unit 114, or the like).

The masked atomic update instruction is then executed (block 404). As part of executing the masked atomic update instruction, at least one data field associated with a destination address specified by the masked atomic update instruction is masked (block 406). The processing unit 114, for instance, provides the destination address 208 and the mask 212 to the memory controller 120 as part of a request for the at least one destination value 214 from the data storage location 216. The memory controller 120 identifies, based on the mask 212, masked bits 222 that are not compared or updated as part of executing the masked atomic update instruction 202. At least one unmasked data field associated with the destination address is provided to a first processing unit (block 408). The memory controller 120, for instance, grants the memory request and communicates the at least one destination value 214 (e.g., one or more bits of the data storage location 216 other than the masked bits 222) to the processing unit 114 for use in executing the masked atomic update instruction 202.

During execution of the masked atomic update instruction 202 (e.g., while the processing unit 114 is comparing and/or updating the at least one destination value 214), a request for a second processing unit to access data associated with the destination address is received (block 410). The memory controller 120, for instance, receives a request from processing unit 220 to access data from the data storage location 216.

A determination is then made as to whether the request from the second processing unit is for a masked data field (block 412). In response to the request from the processing unit 220 being for only one or more of the masked bits 222 and not requesting one or more bits that are compared and/or updated as part of executing the masked atomic update instruction 202 (e.g., a "Yes" determination at block 412), the second processing unit's request is granted (block 414). The memory controller 120, for instance, permits the processing unit 220 to read and/or write the masked bits 222 from the data storage location 216. Alternatively, in response to the request from the second processing unit being for the at least one destination value 214 that is compared and/or exchanged as part of executing the masked atomic update instruction 202 (e.g., a "No" determination at block 412), the second processing unit's request is denied (block 416). The memory controller 120, for instance, prevents the processing unit 220 from accessing the requested data from the data storage location 216.

The masked atomic update instruction 202 described herein thus provides bit-level granularity by which another thread is prevented from accessing bits associated with a data storage location. This bit-level granularity advantageously permits multiple threads to access and modify a common data storage location while ensuring atomicity, which is not possible using conventional approaches and systems. In this manner, the techniques described herein enable hardware platforms to realize technical advantages not afforded by conventional system architectures (e.g., decreased power consumption, decreased latency, additional bandwidth, and so forth).

Various implementations are possible based on the disclosure herein, and the described techniques are not so limited to the specific examples described above. Although features and elements are described above in particular combinations, each feature or element is usable alone without the other features and elements or in various combinations with or without other features and elements.

What is claimed is:

1. A system comprising:
    a circuit board having memory mounted to the circuit board; and
    a processing unit configured to:
        obtain a data structure that includes multiple fields from the memory;
        compare a subset of the multiple fields to at least one source value specified by a masked atomic update instruction;
        in response to the subset of the multiple fields matching the at least one source value, modifying the data structure using at least one replacement value specified by the masked atomic update instruction; and
        while comparing the subset of the multiple fields to the at least one source value and while modifying the data structure, permit a different processing unit to access, from the data structure, fields excluded from the subset of the multiple fields.

2. The system of claim 1, wherein the processing unit is configured to obtain the data structure by:
    transmitting a memory request for data stored in the memory to the circuit board; and
    in response to transmitting the memory request, causing the data structure to be returned to the processing unit.

3. The system of claim 2, wherein in response to transmitting the memory request, the processing unit is configured to cause the subset of the multiple fields to be returned to the processing unit.

4. The system of claim 1, wherein the multiple fields are configured as storing a first number of bits and wherein the subset of the multiple fields is configured as storing a second number of bits that is smaller than the first number of bits.

5. The system of claim 1, wherein the subset of the multiple fields is defined by a mask that describes a position for each of the subset of the multiple fields relative to the multiple fields of the data structure.

6. The system of claim 1, wherein the processing unit is further configured to permit a different processing unit to access the multiple fields of the data structure in response to modifying the data structure using the at least one replacement value.

7. The system of claim 1, wherein modifying the data structure using the at least one replacement value comprises modifying at least one field of the subset of the multiple fields.

8. The system of claim 1, wherein modifying the data structure using the at least one replacement value is performed independent of modifying a field of the data structure that is not included in the subset of the multiple fields.

9. The system of claim 1, wherein the processing unit is further configured to not modify the data structure in response to the multiple fields not matching the at least one source value.

10. The system of claim 1, wherein the at least one source value comprises multiple source values, the multiple source values including a corresponding source value for each data field in the subset of the multiple fields.

11. The system of claim 1, wherein the processing unit is configured to compare the subset of the multiple fields and modify the data structure independent of a lock on the data structure.

12. The system of claim 1, wherein the processing unit is configured to obtain the data structure, compare the subset of the multiple fields to the at least one source value, and modify the data structure using the at least one replacement value as part of executing the masked atomic update instruction, wherein the masked atomic update instruction specifies:
    the at least one source value;
    the at least one replacement value;
    a destination address for the data structure; and
    a mask that defines the subset of the multiple fields.

13. A system comprising:
    a circuit board having memory mounted to the circuit board;
    a first processing unit;
    a second processing unit configured to execute a masked atomic update instruction by:
        comparing a subset of multiple fields of a data structure to at least one source value specified by the masked atomic update instruction; and
        modifying the data structure using at least one replacement value specified by the masked atomic update instruction in response to the subset of the multiple fields matching the at least one source value; or
        not modifying the data structure in response to the subset of the multiple fields not matching the at least one source value;
    the second processing unit further configured to prevent the first processing unit from modifying the subset of the multiple fields of the data structure while executing the masked atomic update instruction; and
    the first processing unit configured to modify fields of the data structure excluded in the subset of the multiple fields while the second processing unit is executing the masked atomic update instruction.

14. The system of claim 13, wherein the second processing unit is configured to execute the masked atomic update instruction independent of locking the data structure.

15. The system of claim 13, wherein the first processing unit is configured to modify the subset of the multiple fields in response to the second processing unit completing execution of the masked atomic update instruction.

16. A device comprising:
    a processing unit configured to:
        receive a masked atomic update instruction that includes information describing:
            an address for a data storage location;
            at least one source value;
            at least one replacement value; and
            a mask; and
        execute the masked atomic update instruction by:
            identifying, from a data structure associated with the data storage location, a subset of multiple data fields using the mask;
            comparing the subset of the multiple data fields to the at least one source value; and
            modifying the data structure using the at least one replacement value in response to the subset of the multiple data fields matching the at least one source value; or
            not modifying the data structure in response to the subset of the multiple data fields not matching the at least one source value; and
        allow a different processing unit to access, from the data storage location, data fields that are excluded from the subset of the multiple data fields during the executing the masked atomic update instruction.

17. The device of claim 16, wherein the processing unit is further configured to prevent the different processing unit from accessing the subset of the multiple data fields during the executing the masked atomic update instruction.

18. The device of claim 16, wherein the processing unit is configured to obtain the data structure by:

transmitting a memory request for data stored in a memory; and in response to transmitting the memory request, causing the data structure to be returned to the processing unit.

19. The device of claim 18, wherein in response to transmitting the memory request, the processing unit is configured to cause the subset of the multiple fields to be returned to the processing unit.

20. The device of claim 16, wherein the processing unit is further configured to permit the different processing unit to access the multiple fields of the data structure in response to modifying the data structure using the at least one replacement value.

\* \* \* \* \*